United States Patent [19]
Appel et al.

[11] 3,822,907
[45] July 9, 1974

[54] BUMPER ARRANGEMENT

[75] Inventors: Hermann Appel, Berlin;
Horst-Rüdiger Majer, Wolfsburg;
Conrad Oehlerking, Braunschweig,
all of Germany

[73] Assignee: Volkswagen werk Aktiengesellschaft,
Wolfburg, Germany

[22] Filed: July 9, 1973

[21] Appl. No.: 377,450

[30] Foreign Application Priority Data
July 11, 1972 Germany............................ 2233972

[52] U.S. Cl.................... 293/63, 293/99, 188/1 C,
280/106 R
[51] Int. Cl........................... B60r 19/04, F16f 7/12
[58] Field of Search.............. 293/1, 63, 70, 87, 89,
293/99; 188/1 C; 180/93; 280/106 R; 296/28
R, 35

[56] References Cited
UNITED STATES PATENTS
3,097,725   7/1963   Peterson........................... 188/1 C
3,638,748   2/1972   Tixier............................. 280/106 R

*Primary Examiner*—M. Henson Wood, Jr.
*Assistant Examiner*—Robert Saifer
*Attorney, Agent, or Firm*—Brumbaugh, Graves, Donohue & Raymond

[57] ABSTRACT

A bumper system has at least one element for absorbing impact energy by deflection in a direction generally parallel to the direction of the impact. The element has a terminal energy-absorption value beyond which additional energy is not absorbed and further deflection does not occur. The bumper system also includes a mounting support that is used to join the element to the object to be protected and that is capable of asymetrical energy-absorbing deformation so that, upon receipt by the bumper system of an impact having an energy value greater than the terminal energy-absorption value of the element and after full deflection of the element, the fully-deflected element is rotated through an angle of at least 90°.

10 Claims, 7 Drawing Figures

BUMPER ARRANGEMENT

BACKGROUND OF THE INVENTION

The present invention relates generally to bumper arrangements, and, more particularly, to bumper arrangements for automotive vehicles having elements that are joined, by means of mounting supports, to the protected automobile and that dissipate or absorb the energy of an impact by a reduction in length in the direction of the impact to a terminal energy-absorption value conditioned on the element construction.

It is customary to use, as energy-absorbing means, either telescoping arrangements of cylinders and pistons with a pressure medium, i.e., hydraulic shock absorbers, or devices that absorb or neutralize impact energy through friction. When the individual components of such energy-absorbing means are designed, it must be considered that in order to withstand the pressure build-up in the pressure medium or the resistance force attained through friction, a certain rigidity of the individual components is necessary. Thereby, when the energy absorption has been completed, i.e., when the terminal energy-absorption value has been reached, the individual components will act as a rigid unit. For example, following the reduction of a hydraulic cylinder's extension in the direction of the impact to the aforementioned terminal value, i.e., following application of the piston against a counter surface of the cylinder, further deflection of the telescoped unit during the subsequent course of the impact is no longer possible. If the hydraulic cylinder components are, for example, a portion of the front bumper arrangement of an automobile, they become, on attaining the hydraulic cylinder terminal energy-absorption value, rigid bars that are directed towards the passenger compartment.

SUMMARY OF THE INVENTION

There is provided, in accordance with the invention an improved bumper arrangement that does not possess the shortcomings of the prior art and offers the advantage of having greater deformation distance available for energy absorption.

More particularly, a bumper arrangement, in accordance with the invention, includes mounting supports for joining the energy-absorbing means to the object to be protected that are designed to deform asymmetrically so that after the terminal energy-absorption value has been reached during an impact, each of the energy-absorbing means rotates to at least an approximately vertical plane. Thus, the mounting supports are designed to act as pivots or hinges for the energy-absorbing means. However, the mounting supports are designed to resist the rotating motion so that it can occur only when the energy-absorbing means have been deformed to their terminal energy-absorption value.

As indicated above, when hydraulic shock absorbers are used as energy-absorbing means, the terminal value is reached when the shock absorber piston has come into contact with the end of the cylinder. Similar terminal values exist when elements are used that employ a non-fluidic energy absorption medium, such as a core material consisting of spheres formed of a brittle material that, upon an impact, are partially crushed and also rub against one another to absorb the impact energy by friction.

Since it is desirable that the mounting supports not permit rotation of the energy-absorbing means until the terminal energy-absorption values have been exceeded, it is advantageous if the portion of the mounting supports on the side toward which the energy-absorbing means rotate are designed to have less rigidity than portions of the mounting supports on the side away from which the energy-absorbing means rotate. The mounting supports must also be designed, however, to enable them to absorb the stresses transmitted to them during the deflection of the energy-absorbing means without deforming until the terminal energy-absorption values have been exceeded. A bumper arrangement in accordance with the present invention displays increasing rigidity characteristics, therefore, as an impact object advances from the outer ends of the energy-absorbing means in the direction towards the object to be protected. For example, when an automobile modified in accordance with the present invention collides with another object, the hydraulic shock absorbers adjacent the bumper will first become operative, and, thereafter, when the shock absorbers have dissipated an amount of energy equal to their terminal energy-absorption value, further energy absorption occurs by rotation of the shock absorbers due to the design of the mounting supports.

Specifically, it is possible to achieve the desired rotation by forming the mounting supports of portion having different wall thicknesses, i.e., by providing a wall of lesser thickness in the mounting support portions on the side of the mounting support toward which the energy-absorbing means rotates. The same result may also be achieved by including within the mounting support portions on the side of the mounting support toward which the energy-absorbing means rotates, corrugations arranged generally perpendicular to the impact direction and/or by including in the mounting support portions on the side of the mounting support opposite the desired energy-absorbing means rotation direction, corrugations arranged generally parallel to the direction of impact.

It is especially useful to construct the mounting supports in such a manner that the energy-absorbing means rotates downward so that, for example, the passenger space in an automobile modified in accordance with the invention is pushed away in somewhat of an upward direction during continuation of an impact to the automobile.

If the invention is employed in the protection of an automobile, the mounting supports can be longitudinal members that are attached to the vehicle body frame. Such members might include, for purposes of attachment to the frame, a fork-shaped region extending towards the frame including attachment portions that define a line generally perpendicular to said direction at the points of attachment so that the fork-shaped region achieves additional stiffening of the vehicle body frame. As explained above, the region of the longitudinal members attached to the energy-absorbing means is designed to permit rotation of the energy-absorbing means after the energy-absorbing means has absorbed an impact energy equal to its terminal energy-absorption value.

An important characteristic of the present invention comprises the linking of the elements in such a manner as to permit the rotation of the energy-absorbing means upon receipt, by the object to be protected, of an impact stress greater than a selected stress value. In this respect, the invention contrasts previously known arrangements, such as disclosed by West German published Pat. application No. 1,811,453, in which specific care is taken to ensure that deflection of the energy-absorbing means occurs only in one direction. Contrarily the present invention permits rotation of the energy-absorbing means in a predetermined direction after the energy-absorbing means has reached the limit of its impact-absorbing capabilities. Therefore, the mounting supports should be designed to have adequate rigidity to ensure that rotational deviations by the energy-absorbing means from the predetermined direction are prevented.

The present invention is not limited to use in automobiles, but may be employed to advantage in other vehicles as well as with stationary objects such as stop blocks.

BRIEF DESCRIPTION OF THE DRAWINGS

FIG. 1(a) is a partial view, in the direction of arrow A in FIG. 1, of a portion of a mounting support;

FIG. 1(b) is a cross-sectional view of a mounting support according to a further embodiment of the invention;

DESCRIPTION OF THE PREFERRED EMBODIMENTS

Figure 1:
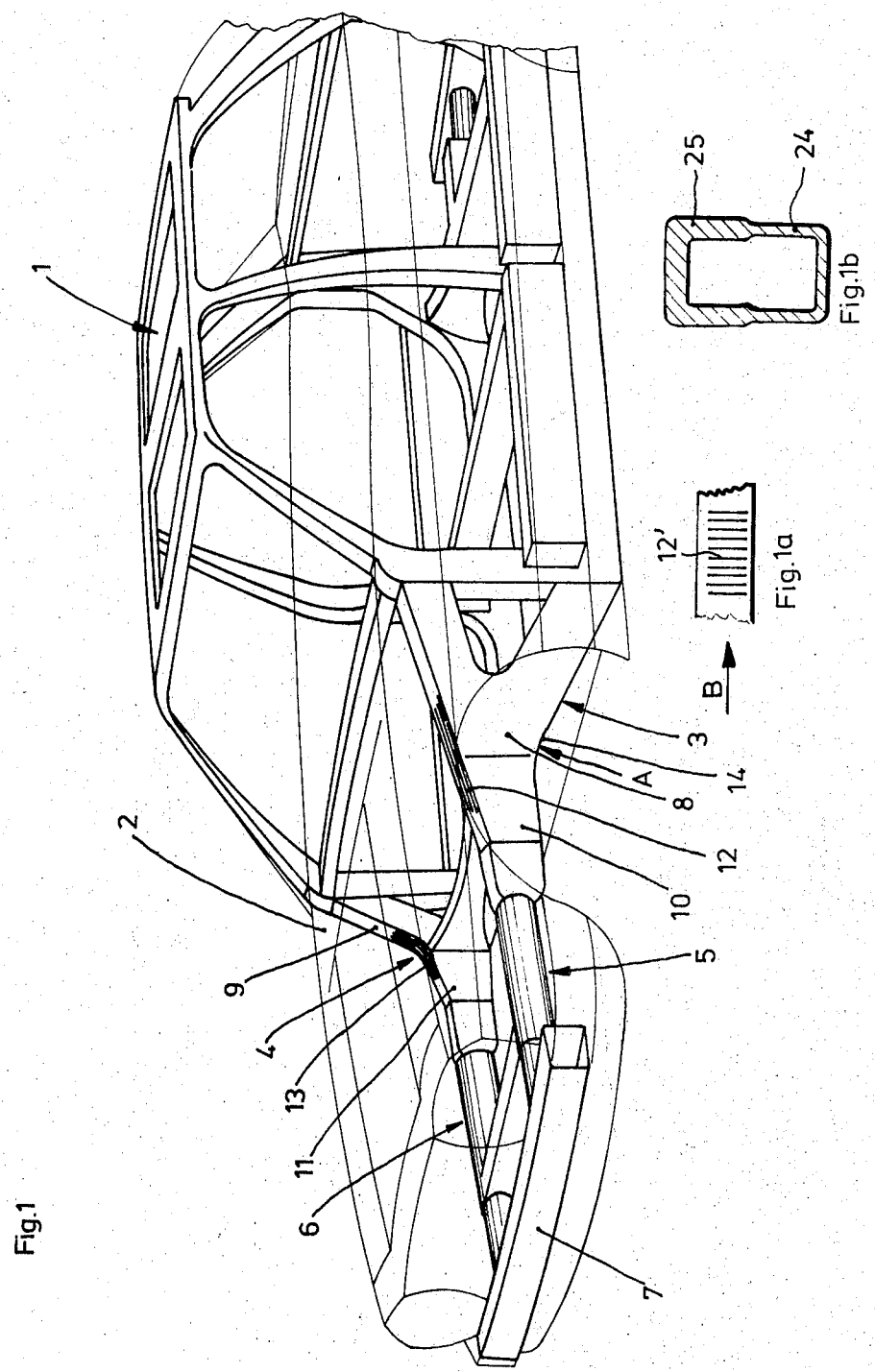
FIG. 1 is a fragmentary perspective view of the front end of an automobile frame and body.

FIG. 1 shows an automobile passenger space frame and body 2. The design of the frame 1 and body 2 are not important for present purposes. It is necessary only that they form a strong passenger space so that in a collision or other impact, it is primarily the front and rear ends of the automobile that are deformed.

Connected to the frame 1 are mounting supports 3 and 4 for attachment to energy-absorbing means such as hydraulic shock absorbers 5 and 6 for absorption of impact energy by deflection in a direction generally parallel to the direction of the impact. The shock absorbers 5 and 6 can be conventional. The ends of the shock absorbers 5 and 6 opposite the mounting supports 3 and 4 carry a bumper 7, which in the present embodiment comprises a hollow section.

Each of the mounting supports comprises two zones. Zones 8 and 9 are fork-shaped, the "tines" facing the frame 1. The zones 10 and 11, which face the shock absorbers 5 and 6, respectively, form the "handle" of the fork and are simple in shape. A fixed linking of each mounting support 3 and 4 to the frame 1 is ensured by the fork-shaped regions 8 and 9, respectively. Furthermore, the frame 1 is strengthened by the regions 8 and 9.

In a low-energy collision, an object strikes the bumper 7 and shock absorbers 5 and 6 are driven back to absorb the impact energy. After the impact energy has been neutralized, the shock absorbers return to their normal positions, and the bumper arrangement is ready to receive and neutralize the energy of another minor impact.

In accordance with the invention, the zones 10 and 11 are designed so that, in a high-energy collision, after energy-absorption by the shock absorbers 5 and 6 has terminated, that is, after the shock absorbers have absorbed impact energy equal to their terminal energy-absorption value, they permit a rotation of the fully-deflected shock absorbers in a downward direction. To accomplish such rotation, the portions of the mounting supports 3 and 4 away from which the shock absorbers rotate, in this case the upper portion, are provided longitudinal corrugations as indicated in FIG. 1 at 12 and 13. The portions of the mounting supports toward which the shock absorbers rotate, e.g., the portion 14 in the mounting support 3, are provided with crosswise corrugations. In FIG. 1a, crosswise corrugations 12' in the bottom portion of mounting support 3 are shown. The corrugations 12' are arranged generally perpendicular to the direction of impact, indicated by arrow B. Accordingly, the bottom portions of the mounting supports 3 and 4 have less compressional rigidity than the top portions. However, the lower rigidity value is chosen so that the rotation of the shock absorbers 5 and 6 can occur only after the terminal energy-absorbing values of the shock absorbers 5 and 6 have been reached.

As an alternative, the desired rotation of the shock absorbers can be ensured by forming the mounting support with varying wall thicknesses. FIG. 1(b) shows a vertical section through a portion of a mounting support for use in a bumper arrangement in which it is desired that the shock absorber rotate downward after absorption of an impact energy equal to its terminal energy-absorbing value. Accordingly, the lower portion 24 of the support has a thinner wall section than the upper portion 25. The upper portion 25 has, therefore, greater compressional rigidity and the mounting support will deform in a manner causing downward rotation of a shock absorber.

Figure 2:
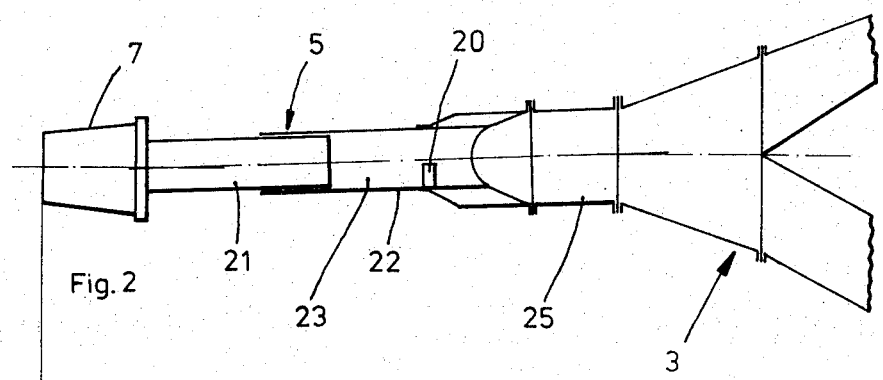
FIG. 2 is a diagrammatic longitudinal view of the energy-absorbing portion of the structure of FIG. 1 prior to impact.

FIG. 2 shows one of the shock absorbers, say the shock absorber 5, in greater detail. It is connected at one end with the bumper 7. The shock-absorber piston 21 is contained in a cylinder 22, the piston and the cylinder together forming a space 23, which contains a pressure medium. The cylinder 22 is linked to the mounting support, generally designated 3. The mounting support is fork-shaped in its right-hand zone, in the manner described in connection with FIG. 1. The support also has a zone, appearing on the left in the FIG. 2, which is shaped and dimensioned so as to facilitate the rotational motion of the hydraulic shock-absorber.

Figure 2A:
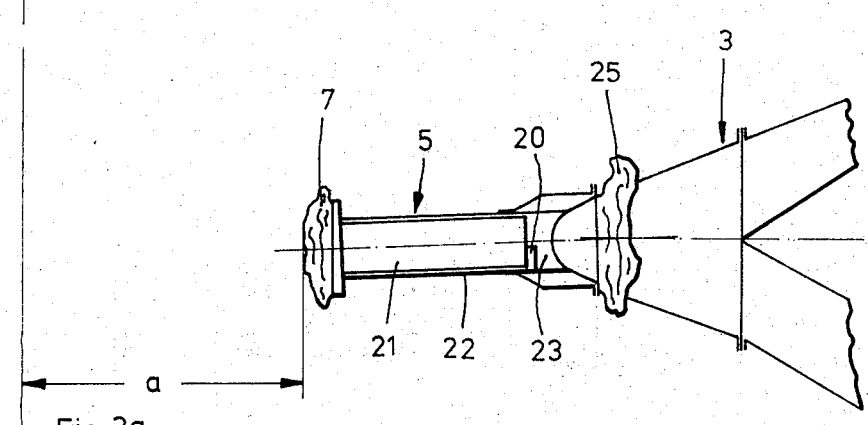
FIG. 2(a) is a diagrammatic longitudinal view of the structure of FIG. 2 during an impact.

FIG. 2 represents the normal operating condition of a bumper arrangement in accordance with the invention. When an impact occurs, the piston 21 is forced into the cylinder 22, with the pressure medium compressing and possibly draining out of the space 23. FIG. 2(a) represents a condition just beyond the "end" condition for the effectiveness of the various energy-absorbing elements. Both the bumper 7 and a deformable portion 25 of the mounting support 24 are deformed to the extent that their axial dimensions have been reduced to a constructionally predetermined terminal energy-absorption value. This terminal value has been structurally determined for the shock-absorber by a stop 20 for the piston 21 in the cylinder 22. Accordingly, the energy-absorbing elements are rigid and, without modification of the bumper arrangement in accordance with the present invention, they might be pushed into the passenger compartment on continuation of the impact.

Figure 2B:
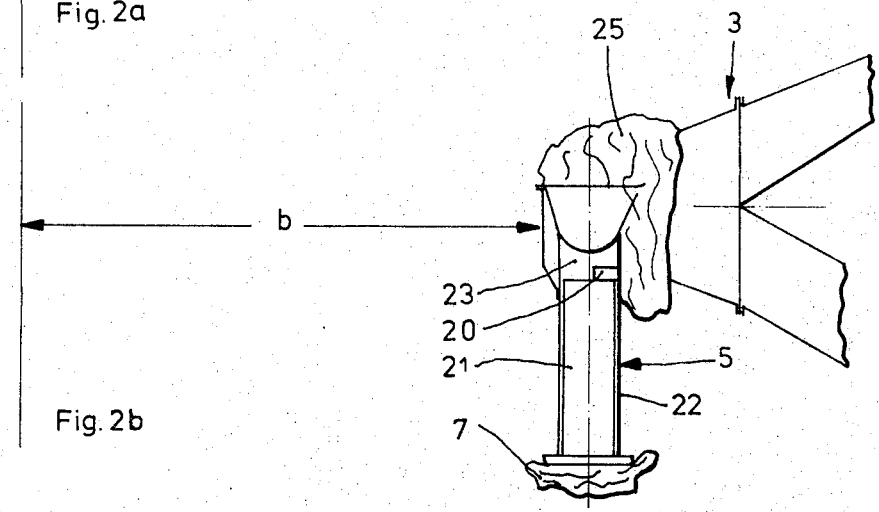
FIG. 2(b) is a diagrammatic longitudinal view of the structure of FIG. 2 after rotation of the energy-absorbing means in accordance with the present invention.

In accordance with the invention, the deformation distance "a," indicated in FIG. 2a, is increased to the deformation distance "b," indicated in FIG. 2b, since the mounting support 3 is designed so that, after the threshold value has been reached or slightly surpassed, as shown in FIG. 2a, the support permits a rotation of the bumper arrangement in a downward direction. Thereby, the distance available for energy-absorbing deformation of the bumper arrangement is increased and the rigid elements of the bumper arrangement are prevented from being pushed dangerously further back toward the passenger compartment. Moreover, the time of energy-absorbing deformation is increased and the "G" force experienced by the passengers is decreased.

Although the invention has been described as a front bumper arrangement for an automobile, it will be apparent that the bumper arrangement can be used to advantage for rear bumper arrangements as well as for other kinds of vehicles.

Figure 3:
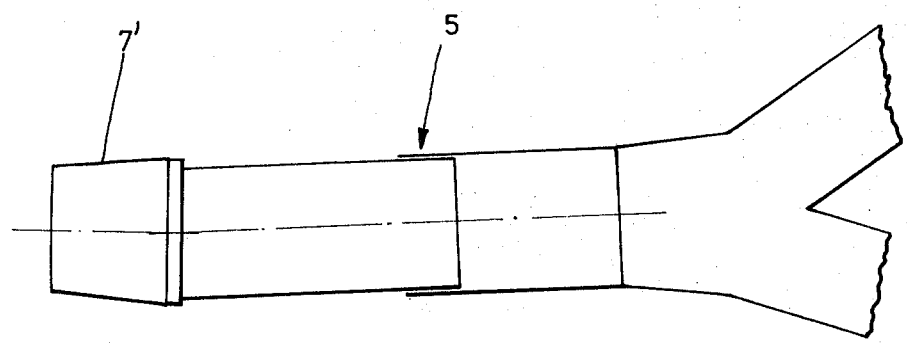
FIG. 3 is a diagrammatic longitudinal view of a bumper arrangement according to a further embodiment of the invention.

It is also possible to design the mounting supports to orient the elements in an upward or downward direction, as shown in FIG. 3. By this simple structural measure, the rotation of the elements following termination of their energy absorption is ensured.

Many other variations and modifications of the invention will be apparent to those skilled in the art without departing from the spirit and scope of the invention. The above-described embodiments are, therefore, intended to be merely exemplary, and all such variations and modifications are intended to be included within the scope of the invention as defined in the appended claims.

We claim:

1. In a bumper system for protection of an object from an impact and having means for absorption of the impact energy by deflection in a direction generally parallel to the direction of the impact, said means having a terminal energy-absorption value beyond which additional impact energy is not absorbed and further deflection does not occur and the system further having at least one mounting support for connection of said means to the object protected, the improvement comprising means, in the mounting support, for ensuring asymmetrical energy-absorbing deformation of the support so that, upon receipt by the bumper system of an impact having an energy value exceeding the terminal energy-absorption value and after full deflection of the energy-absorbing means in said direction, the fully-deflected energy-absorbing means is rotated to at least an approximately vertical plane.

2. A bumper system according to claim 1 wherein the mounting support deformation means includes means, in a portion of the mounting support toward which the fully-deflected energy-absorbing means is to be rotated, for providing a lower impact-withstanding rigidity than in the remainder of the mounting support.

3. A bumper system according to claim 2 wherein the mounting support includes at least one wall imparting structural rigidity to the support and further wherein the impact-withstanding rigidity means includes the provision, in cross-section of a lesser wall thickness in the wall of said mounting support portion than in the wall of the remainder of the mounting support.

4. A bumper system according to claim 2 wherein the impact-withstanding rigidity means includes the provision, in said mounting support portion, of corrugations arranged generally perpendicular to said direction.

5. A bumper system according to claim 2 wherein the impact-withstanding rigidity means includes the provision, in a portion of the mounting support opposite that to which the fully-deflected element is to be rotated, of corrugations arranged generally parallel to said direction.

6. A bumper system according to claim 1 wherein the protected object is the front portion of an automotive vehicle and, upon impact, the fully-deflected element is rotated downwardly.

7. A bumper system according to claim 1 wherein the means for absorption of impact energy comprises a shock absorber oriented to absorb impact energy by telescopic action in said direction against the resistance of a pressure medium.

8. A bumper system according to claim 1 wherein the protected object is the front portion of an automotive vehicle having a frame and further wherein each mounting support comprises at least one longitudinal member attached rigidly to the vehicle frame.

9. A bumper system according to claim 8 wherein the longitudinal member has a fork-shaped zone for attachment to the frame including portions that extend toward the frame and define a line generally perpendicular to said direction at the points of attachment to the frame.

10. A bumper system according to claim 1 wherein the mounting support connects the means to the protected object in an orientation such that deflection of the means occurs in a direction not parallel to the direction of the impact.

* * * * *